(12) United States Patent
Bacher et al.

(10) Patent No.: US 9,183,035 B2
(45) Date of Patent: Nov. 10, 2015

(54) VIRTUAL MACHINE MIGRATION WITH SWAP PAGES

(71) Applicant: International Business Machines Corporation, Armonk, NY (US)

(72) Inventors: Utz Bacher, Weil im Schoenbuch (DE); Reinhard Buendgen, Tuebingen (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/075,264

(22) Filed: Nov. 8, 2013

(65) Prior Publication Data

US 2015/0135173 A1   May 14, 2015

(51) Int. Cl.
*G06F 9/455* (2006.01)
*G06F 12/10* (2006.01)

(52) U.S. Cl.
CPC ........ *G06F 9/45558* (2013.01); *G06F 12/1009* (2013.01); *G06F 2009/4557* (2013.01); *G06F 2212/652* (2013.01)

(58) Field of Classification Search
CPC ........................ G06F 9/45533; G06F 9/5077
USPC .......................................................... 718/1
See application file for complete search history.

(56) References Cited

U.S. PATENT DOCUMENTS

| | | | |
|---|---|---|---|
| 7,574,746 B2 * | 8/2009 | Hill et al. ...................... 726/27 | |
| 8,041,877 B2 | 10/2011 | Nevarez et al. | |
| 8,046,641 B2 | 10/2011 | Hernandez et al. | |
| 8,271,450 B2 | 9/2012 | Horovitz et al. | |
| 8,327,086 B2 | 12/2012 | Jacobs et al. | |
| 8,935,506 B1 | 1/2015 | Gopalan | |
| 2004/0062106 A1 | 4/2004 | Ramesh et al. | |
| 2006/0005189 A1* | 1/2006 | Vega et al. ...................... 718/1 |
| 2009/0070401 A1* | 3/2009 | Welch, Jr. ...................... 709/201 |
| 2009/0070776 A1 | 3/2009 | Dahlstedt | |
| 2012/0324181 A1 | 12/2012 | Garthwaite et al. | |
| 2013/0152086 A1* | 6/2013 | Yoo et al. ...................... 718/1 |
| 2014/0007097 A1* | 1/2014 | Chin et al. ...................... 718/1 |

FOREIGN PATENT DOCUMENTS

WO      2013082598 A1    6/2013

OTHER PUBLICATIONS

SuperUser, Does moving a virtual machines swap file to another drive improve performance?, Jul. 4, 2011, superuser.com.*

Hines, M., et al., "Post-Copy Based Live Virtual Machine Migration Using Adaptive Pre-Paging and Dynamic Self-Ballooning," Proceedings of the 2009 ACM SIGPLAN/SIGOPS International Conference on Virtual Execution Environments, ACM New York, NY, USA © 2009. DOI: 10.1145/1508293.1508301.

* cited by examiner

*Primary Examiner* — Emerson Puente
*Assistant Examiner* — Steven Do
(74) *Attorney, Agent, or Firm* — Richard A. Wilhelm

(57) ABSTRACT

Migration of a virtual machine to a new host is coordinated while data that is mapped into virtual (swap) memory of a source instance of the virtual machine (or guest) is properly handled. Sharing rights for one or more swap devices can be modified to facilitate the use of the swap devices by a new host and a corresponding (target) instance of virtual machine running on the new host.

8 Claims, 5 Drawing Sheets

VIRTUAL MACHINE MIGRATION WITH SWAP PAGES

BACKGROUND

This disclosure relates to migration of virtual machines or guests between hosts. In particular, it relates to handling migration of virtual machine that supports memory over commitment using one or more swap devices.

A guest machine, or a virtual machine, can be a virtual appliance, operating system or other type of virtualization-ready workload. From the view of the guest machine, it can function as a separate unit with its own dedicated resources. A hypervisor module can provide virtualization logic that manages one or more virtual machines. The hypervisor module (or just "hypervisor") can assign shares of physical devices/hardware to the virtual machines that run on, and are managed by, the hypervisor. This virtualization can allow multiple virtual machines to run on top of a single physical host by sharing host resources between the multiple virtual machines. Some computer systems allow for multiple hypervisors to be run on their hardware.

Certain systems can allow for virtual machines to be migrated between different hypervisors. For instance, a planned hypervisor outage (e.g., to perform maintenance on a hypervisor) may trigger a migration event that causes one or more virtual machines to be migrated to another hypervisor. Satisfactory coordination between the source and target instances of the virtual machines can be difficult.

SUMMARY

In certain embodiments of the disclosure, a system and method are provided for handling swap pages during the migration of a virtual machine to a target hypervisor. The migration can be facilitated by controlling sharing rights to a swap device that stores the swap pages of the virtual machine and thereby allowing the target hypervisor to access the swap pages that are present on the swap device.

Embodiments are directed toward a method for migrating a virtual machine between a source hypervisor and a target hypervisor that each support memory over commitment using one or more swap devices. The method can comprise: receiving, by the source hypervisor, a migration request that specifies a source instance of the virtual machine on the source hypervisor and the target hypervisor; identifying, by the source hypervisor, at least one swap device that is used by the source instance of the virtual machine and that is physically accessible by the target hypervisor; identifying, by the source hypervisor and for each identified swap device, one or more source swap slots that store at least one swapped out page of the source instance of the virtual machine; halting, by the source hypervisor, processing by the source instance of the virtual machine; granting, to the target hypervisor, access to the one or more source swap slots identified by the source hypervisor; associating, by the target hypervisor, a target instance of the virtual machine with a swap table that references the one or more swap slots granted to the target hypervisor; and using, by the target hypervisor, the one or more swap slots to populate swapped out virtual memory for the target instance of virtual machine.

Certain embodiments are directed toward a system for migrating a virtual machine between hypervisors that each support memory over commitment. The system can comprise: a source hypervisor configured to: receive a migration request that specifies a source instance of the virtual machine on the source hypervisor and the target hypervisor; identify at least one swap device that is used by the source instance of the virtual machine and that is physically accessible by the target hypervisor; identify, for each identified swap device, one or more source swap slots that store at least one swapped out page of the source instance of the virtual machine; and halting processing by the source instance of the virtual machine. A target hypervisor can be configured to: associate a target instance of the virtual machine with a swap table that references the one or more swap slots granted to the target hypervisor; and use the one or more swap slots to populate swapped out virtual memory for the target instance of virtual machine. A firmware module can be configured to grant, to a target hypervisor, access to the one or more source swap slots identified by the source hypervisor.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
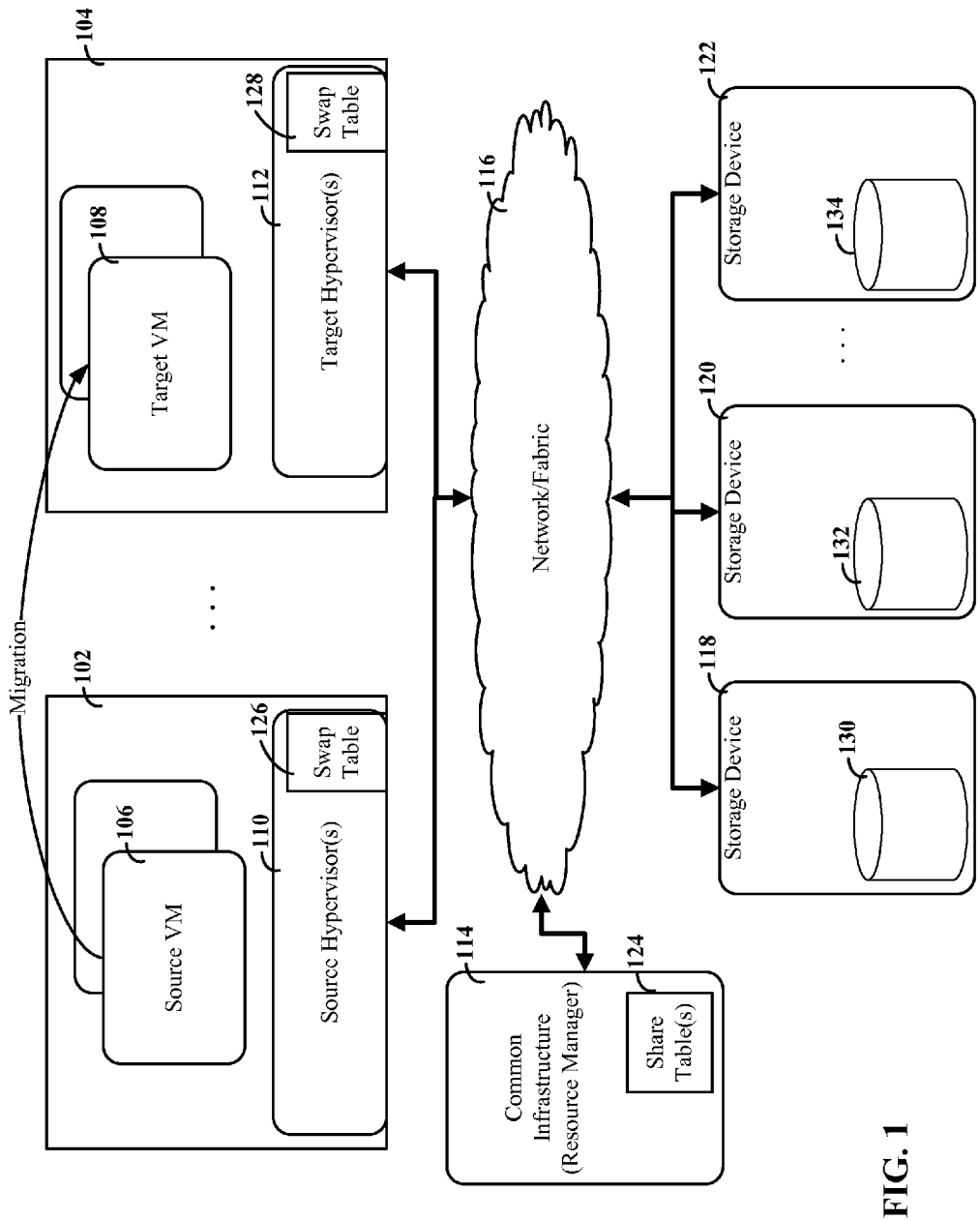
FIG. 1 depicts a block diagram of a system for migrating virtual machines to new hypervisors; consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtual machine migration, more particular aspects relate to handling virtual memory and swapped pages during a virtual machine migration. While the present invention is not necessarily limited to such applications, various aspects of the invention may be appreciated through a discussion of various examples using this context.

Embodiments of the present disclosure are directed toward a system that is configured to coordinate migration of a virtual machine to a new host while handling data that is mapped into virtual (swap) memory of a source instance of the virtual machine (or guest). Consistent with particular embodiments, the system can be configured to control and change/modify sharing of one or more swap devices to facilitate the use of the swap devices by a new host and a corresponding (target) instance of virtual machine running on the new host.

Various embodiments relate to the use of intelligently configured hypervisors and firmware modules to facilitate certain aspects of the migration. For instance, embodiments are directed toward migration that allows for access rights to devices storing swapped memory pages to be transferred between different instances of a virtual machine. This can be useful for using little or no additional memory to complete the migration of the swapped pages. For instance, the migration can be accomplished without placing the swapped pages into memory.

In certain embodiments, a resource manager module can control access to swap devices (e.g., disk drives or other storage devices) to protect against corruption of process memory for virtual machines that may be using the swap device to store swapped pages. For instance, the resource manager may limit accesses to swap device according to the hypervisor requesting access. The hypervisor can be configured to limit access to the appropriate virtual machine. In particular instances, the access control can be such that multiple hosts are allowed to share a swap device while preserving the integrity of swap pages stored therein. For instance, the hypervisors can use a common infrastructure that can include firmware modules (e.g., a resource manager module) that can assign sharing rights to particular portions, or slots, of the swap device.

According to aspects of the present disclosure, hypervisors can control memory access to host hardware for a plurality of virtual machines. For instance, a hypervisor can determine which virtual machines (sometimes referred to as guests or logical partitions) receive more physical memory from the shared memory pool. To help optimize performance and memory use, operating systems that run in shared memory partitions can provide the hypervisor with information about how the operating system uses its memory. This information can help the hypervisor determine which pages to store in the shared memory pool and which pages to store in the swap (paging or paging space) devices.

If the system memory is physically overcommitted (where the sum of the logical memory that is currently used by of all hypervisors and virtual machines is greater than the amount of memory in the shared memory pool), the hypervisor can store a portion of the logical memory in the shared memory pool and store the remainder of the logical memory in the swap devices (sometimes referred to as paging or paging space devices). The hypervisor can determine the amount of physical memory to allocate from the shared memory pool to each virtual machine and the amount of logical memory to store in the swap devices.

When a virtual machine attempts to access a portion (page) of memory that has been swapped, a page fault can occur. A page fault handling routine can be carried out by the hypervisor in order to retrieve the memory page being requested from the swap device. The retrieved memory page can then be placed into main memory. This operation may also include moving an existing page from memory to the swap device to make room for the retrieved page. More complex page fault handling routines are also possible.

In some embodiments, an operating system that runs in a virtual machine can continually move overcommitted logical memory to a paging space. When the hypervisor manages the overcommitted logical memory, it uses information from the page tables to determine which pages to store in the swap device and which pages to store in the shared memory pool.

Consistent with embodiments, a common infrastructure and/or storage resource manager module can provide monitoring and control for storage resources for a group (or cluster) of hosts, which can configured for high availability. If a system provides a shared storage environment, multiple hosts can be given access to the same disk subsystem and to the same disks contained within the disk subsystem. Swap devices, however, store memory pages of a hypervisor and or one or more virtual machines. Systems can be designed such that during normal operation data stored in memory pages is exclusively accessed by the hypervisor. Aspects of the present disclosure are directed toward a system that can maintain this exclusivity while allowing a new hypervisor, running a new instance of the owning virtual machine, to access swap pages previously allocated to the originating, or source, hypervisor.

In various embodiments, the target hypervisor, and its target instance of the virtual machine, can access swap pages previously allocated by the source hypervisor, using a data structure (part of the page table) copied from the source hypervisor. This data structure can define or identify addresses for the swap device by an address and the one or more source swap slots. The target hypervisor can then use the source swap device address and the source swap slot address to retrieve the swapped out page(s) and place them into the virtual machine's memory space. For instance, once the target instance of a virtual machine begins processing on the target hypervisor, it may need access to one or more swapped out pages. The target hypervisor can access the copy of the data structure to find the swapped out pages, retrieve the pages and then populate the slots by placing them into active memory.

Embodiments of the present disclosure are directed toward procedures for giving back exclusive access of a shared swap device to its original owner after the migration of one of more virtual machines were performed. For instance, a cleanup procedure can be carried out after the completion of a migration. The procedure can use a background thread that is configured to copy swap pages from the shared swap device to a swap device that is dedicated to the target hypervisor. This can allow for the migration to be carried out while allowing the target hypervisor with read only access to the shared device. In a particular example, the procedure may be carried out when virtual machines for the source hypervisor will continue to use the swap device. The sharing of the originating swap device with the target hypervisor can be stopped once all swap pages of the target instance of the virtual machine have been copied to another swap device. This can be particularly useful for removing overhead (e.g., storage space, access control monitoring, etc) that may be associated with maintaining a swap device as a shared resource.

Various embodiments are directed toward modifying the content of a swap device so that the target hypervisor receives exclusive access rights to a swap device that was previously accessible to the source hypervisor. This may occur, for instance, when all virtual machines for the source hypervisor are migrated or otherwise stopped, such as during an upgrade or failover. This can be particularly useful for removing overhead (e.g., storage space, access control monitoring, etc) that may be associated with maintaining a swap device as a shared resource.

Turning now to the figures, FIG. 1 depicts a block diagram of a system for migrating virtual machines to new hosts; consistent with embodiments of the present disclosure. The system can include a plurality of different hosts 102, 104. The hosts include underlying hardware computing resources that can support virtual machines (guests) 106, 108. The computing resources can include, but are not limited to, computer processors and memory. The virtual machines 106, 108 can be configured share the computing resources of the hosts 102,

104. Hypervisors 110 and 112 can support this sharing by providing an interface between the virtual machines 106, 108 and the hosts 102, 104. According to some embodiments, hypervisors 110 and 112 can be hosted by a common host (e.g., hosts 102 and 104 can be a single host).

Consistent with certain embodiments, it may be beneficial to allow for the migration of a virtual machine to another host. The migration can be initiated for a variety of different reasons. For instance, the migration can be triggered by a problem with a host or other system component. The migration might also be initiated to perform maintenance, as part of an upgrade or to load balance between hosts. Various other migration causes are possible.

According to certain embodiments, a migration can be carried out by replicating the original (source) instance of the virtual machine 106 at another host. A replicated (target) instance of the virtual machine 108 can be configured to match, from the source instance 106, state information (e.g., program stack information) along with the contents of the mapped memory. As discussed herein, this can also include mapping swapped pages stored in a swap device used by the source instance, to a virtual memory allocation that is mapped to the target instance of the virtual machine.

According to embodiments of the present disclosure, virtual machines 106, 108 can be configured to facilitate communication between virtual machines and external storage devices and networks. For instance, the hypervisors 110, 112 can be connected to a storage area network that allows multiple storage devices 118, 120, 122 to be accessed by, and potentially shared by, the hosts 102, 104. Network 116 can provide routing of data operations between the hosts and storage devices. In certain embodiments, network 116 can be configured as a storage area network (SAN) fabric that can include one or more switches, which can be configured route requests for data access to the appropriate location. In certain instances, the switches can be fibre channel (FC) switches. In other instances, the switches can be configured to use other communication solutions, such as Internet Small Computer System Interface (iSCSI) over Ethernet, or FC over Ethernet. Various embodiments also contemplate a portion of the network being included as part of firmware for the host.

Storage devices 118, 120, 122 can each include one or more storage disks 130, 132, 134 or similar storage hardware. Consistent with embodiments, one or more of these disks can be shared between multiple virtual machines, hypervisors or hosts. Certain disks can be configured as swap devices. These swap devices can store one or more swap pages for a virtual machine. In embodiments, a swap device can be physically accessible by multiple hypervisors, while logical/actual access can be limited to the particular hypervisor in order to maintain data integrity of memory pages stored therein.

Hypervisors 110, 112 can manage swapped pages for virtual machines by maintaining a swap table 126, 128. The swap table can identify where on the swap device particular pages of memory are stored for a virtual machine. The hypervisor can then retrieve the requested pages and update the swap table to indicate as much (e.g., by removing the page from the swap table). The hypervisor can also move pages from memory to a swap device while updating the swap table (e.g., by adding the page to the swap table).

Consistent with certain embodiments, the hypervisors can share a common infrastructure 114. The common infrastructure can be configured to coordinate accesses to the sharable swap devices. In certain embodiments, the common infrastructure 114 can be a firmware layer of a shared hardware with logical partitions in which the hypervisors run. In various embodiments, the common infrastructure 114 can include management software that is configured to manage multiple hypervisors.

According to embodiments, the common infrastructure can include a resource manager module that is configured to provide monitoring, coordination and access control functions for the various storage devices. For instance, a resource manager module can control which hypervisors are allowed to access each of the storage devices. The control can be maintained using one or more share tables 124. For shared storage devices, the share table 124 can specify which hypervisors are permitted to access each storage device.

While the common infrastructure 114 is depicted as external to the network 116 for ease of illustration, data transfers and access requests between hosts and the various storage devices can be controlled and/or pass through the common infrastructure 114, which can be located within (or as part of) the network 116.

Consistent with certain embodiments a source instance of a virtual machine 106 can be targeted for migration from host 102 to another host. The migration can include the receipt of a migration request at hypervisor 110. The migration request can specify a target host or hypervisor for the migration. For instance, the target host could be host 104 and the target hypervisor could be hypervisor 112. The source instance of a virtual machine might be currently using hypervisor 110 to access one or more swap pages stored on a swap device. Accordingly, hypervisor 110 can respond to a received migration request by identifying swap pages (if any) and their location. The location can include the swap device and more specific information about their location. For instance, the more specific information can be referred to as a slot, where a slot represents a lower bound to block sizes for allocating swap space in the swap device.

In certain embodiments hypervisor 110 can have exclusive access rights for the swap device. Accordingly, hypervisor 110 can mark the swap device as being a shared device. In certain embodiments, marking can be accomplished by sending a notification to resource manager module 114, which can then update its share table 124.

Consistent with various embodiments, the swap device may provide swap space for multiple virtual machines. Accordingly, the source hypervisor 110 can be configured to identify relevant swap pages for the virtual machine being migrated. These identified swap pages can be provided to the resource manager 114 along with information identifying the target hypervisor 112. The resource manager can then modify the share table to indicate that the target hypervisor has access rights to the identified swap pages. A target hypervisor can then query the resource manager module to request information on swap slots that are assigned to the target hypervisor.

Particular embodiments are directed toward the use of sharing access control that allows different portions within the swap device to be shared with multiple hypervisors. For instance, the swap device can be shared according to a granularity that matches storage properties of the store device. For instance, the access rights (swap slots) can be set to match raw blocks or volumes by directly assigning access rights to the swap device (e.g., such as volumes of a hard disk drive). This raw disk access can be useful for bypassing virtual mappings of hypervisors, operating system and certain caches and buffers. Moreover, this can be useful for mitigating or eliminating the desirability or need to use metadata on the disk. For instance, the sharing table can specify access rights according to swap slots that correspond to raw blocks or volumes on disk drives.

Consistent with various embodiments, the hypervisors can control when the source virtual machine is halted and the target virtual machine begins processing. For instance, the source instance of the virtual machine can be halted in conjunction with the share table being updated. This may include stopping the source virtual machine before its access to the swapped pages is removed and with sufficient time to allow any in-progress accesses to the swapped pages to complete. The target instance of the virtual machine can be started after access to the swapped pages has been granted to its hypervisor. This can be useful for avoiding access attempts to the swap device before access is allowed.

Consistent with embodiments, the target hypervisor can be configured to configure a data structure, such as a paging table, to point to a shared swap device. Accesses to the swapped pages will result in a page fault. A page fault handling routine can use the data stored in the paging table to identify and access the shared swap device. The swapped pages can be retrieved and loaded into memory associated with the target hypervisor and its host.

Figure 2:
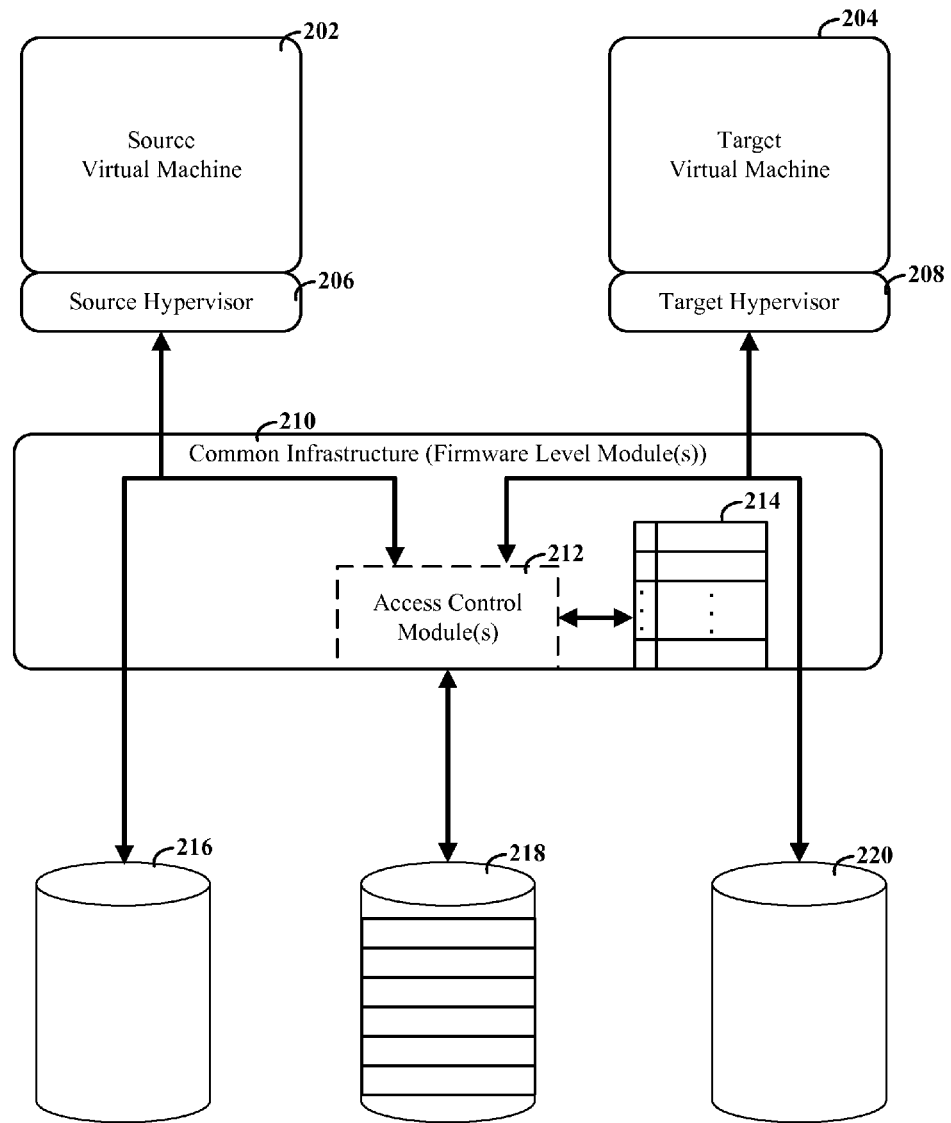
FIG. 2 depicts a block diagram of a system in which various modules reside within firmware, consistent with embodiments of the present disclosure.

FIG. 2 depicts a block diagram of a system in which various modules reside within firmware, consistent with embodiments of the present disclosure. As discussed herein, embodiments are directed toward a system designed to carry out many of the migration functions at the firmware level using a common infrastructure. A source instance of virtual machine 202 can be slated for migration to a new host. The migration includes the use of a target instance of the virtual machine. Each instance of the virtual machine can be associated with a different and respective hypervisor 206, 208. The system can be configured with one or more storage devices 216, 218, 220. Some of these storage devices can be configured for use as shared data storage devices, others can be configured as dedicated data storage devices, still others can be configured as swap devices. Storage device 218 is depicted as containing multiple different accessible data slots, each of which can be configured to store one or more swap pages. As discussed herein, the system can be configured to store swap pages for different virtual machines in their respective and different slots.

Embodiments are directed toward various access control solutions and modules that can be used in conjunction with one or more swap devices 218. As discussed herein, this access control can allow for a common swap device to be shared between multiple hypervisors. The system can be designed to provide access control that maintains data integrity for swapped pages, while still allowing for the swap device to be shared between multiple hypervisors. For instance, the system can limit access to a swap page so that only a single hypervisor has access at any given time. This level of access control can be accomplished using variety of different solutions.

In certain embodiments, the hypervisors 206, 208 access a sharing table or slot assignment table 214. This table can be stored at the firmware level, within a common infrastructure 210, and can specify which virtual machine has access to each slot. When a request for data mapped to a swap device is received by a hypervisor (e.g., in response to a page fault), the hypervisor can permit or deny access based upon the contents of the table. When a migration occurs, the table can be updated and subsequent access attempts will be governed by the new sharing rights. In this manner, the hypervisors can manage and control access rights to swap pages by denying or allowing access consistent with the sharing table, which can be stored at the firmware level. The source hypervisor can mark as inaccessible entries of its paging table containing the corresponding swap slots, while the target hypervisor can expand its memory space to include the swap slots by modifying a local paging table.

In embodiments, access control to swap devices can be managed by one or more access control modules 212. These access control modules 212 can operate at the firmware level and can limit and allow access to shared drives based upon associations stored in share table 214. For instance, share table 214 can specify that disk areas (or slots) are accessible by a particular hypervisor and limit accesses accordingly. As discussed herein, the share table can be modified as part of a virtual machine migration and thereby allow swapped pages to be accessed by a target hypervisor without copying the pages or storing them in memory.

Consistent with embodiments, a particular hypervisor (e.g., a target or source hypervisor) can determine that no other hypervisor has access rights to swap slots of a particular swap device that is also shared. This might occur where all swapped slots granted to a target hypervisor are removed from the particular swap device (e.g., copied to another swap device or removed due to the target host not having memory that is overcommitted). This might also occur when a source hypervisor has each of its swap pages transferred to a target hypervisor. In such instances, the particular hypervisor can declare/request that the particular swap device cease to be shared. For embodiments in which a resource manager uses a share table, the resource manager can remove the swap device from the share table.

Figure 3:
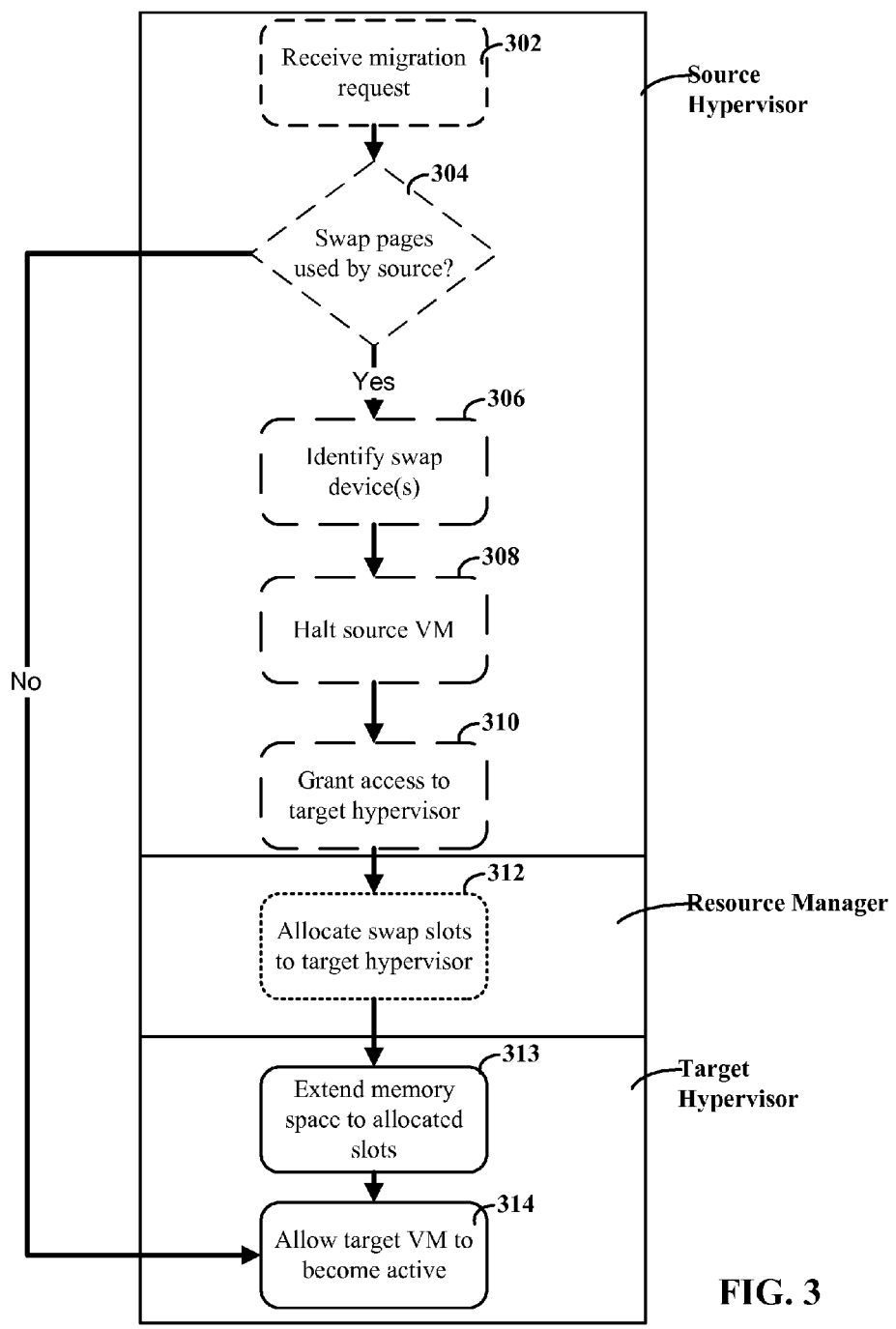
FIG. 3 depicts a flow diagram for the migration of a virtual machine to a new hypervisor, consistent with embodiments of the present disclosure.

FIG. 3 depicts a flow diagram for the migration of a virtual machine to a new hypervisor, consistent with embodiments of the present disclosure. The various blocks are depicted with dashed, dotted and solid lines. In certain embodiments, functions associated with blocks having dashed lines can be carried out by a source hypervisor, those with dotted lines can be carried out by a resource manager or a source hypervisor and those with solid lines can be carried out by a target hypervisor. The disclosure, however, is not necessarily so limited. For instance, functions associated with a particular hypervisor could be carried out by a separate module that is called by (or otherwise coordinated with) the hypervisor.

Block 302 represents the receipt of a migration request by a source hypervisor. The migration request can identify one or more virtual machines for migration and may also identify a target hypervisor or host for migration. In certain embodiments, the identification of a target hypervisor can be generic such that the source hypervisor can select the target hypervisor from one or more available hypervisors.

In response to the migration request, it can be determined whether or not source instance(s) of the virtual machine(s) have swapped memory pages that reside in a swap device, per block 304. If not, then target instance(s) of the virtual machine(s) can be activated (allowed to begin processing), per block 314. If there are swapped pages, then the associated swap device(s) can be identified, per block 306.

Processing of the source instance(s) of the virtual machine(s) can be halted in preparation for migration, per block 308. As discussed herein, certain embodiments allow for the swap devices identified in block 306 to be added to a share table that specifies which hypervisors have access to the swap devices. The initial addition of the swap devices (and their associated swap slots) to the share table can be carried out with access/sharing rights being granted to the source hypervisor. The shared swap devices can each contain one or more swap slots.

Access to the identified swap devices can be granted to the target hypervisor(s), per block 310. For instance, a source hypervisor can announce information about the migration event to a common infrastructure. The common infrastructure can modify the access rights to the swap device(s) such that they become shareable devices with the appropriate target hypervisor(s). This grant can also include the removal of access rights for the source hypervisor(s) (e.g., by removing access rights from a share table). Particular swap slots can then be assigned to the target hypervisor(s), per block 312. The allocation can be carried out by indicating, within a swap table, that the swap slots are accessible by the target hypervisor(s).

Per block 313, the information on swap slots assigned to the target hypervisor can be used by the target hypervisor to extend the memory to include the swap slots stored on the shared swap device. In certain embodiments, this can include modifying page table that is maintained by the target hypervisor(s) so that accesses to the swap slots are directed to the shared swap device. As pages are accessed by the target hypervisor(s), they can be directly retrieved from the shared swap device. Additional swap pages can be stored on the shared swap device in slots assigned to the target hypervisor, or on a swap device that is dedicated to the target hypervisor(s).

The target instance(s) of the virtual machine(s) can then be activated (allowed to begin processing), per block 314. Various embodiments contemplate modifications to the flow depicted in FIG. 3, including the addition of one or more functions.

Figure 4:
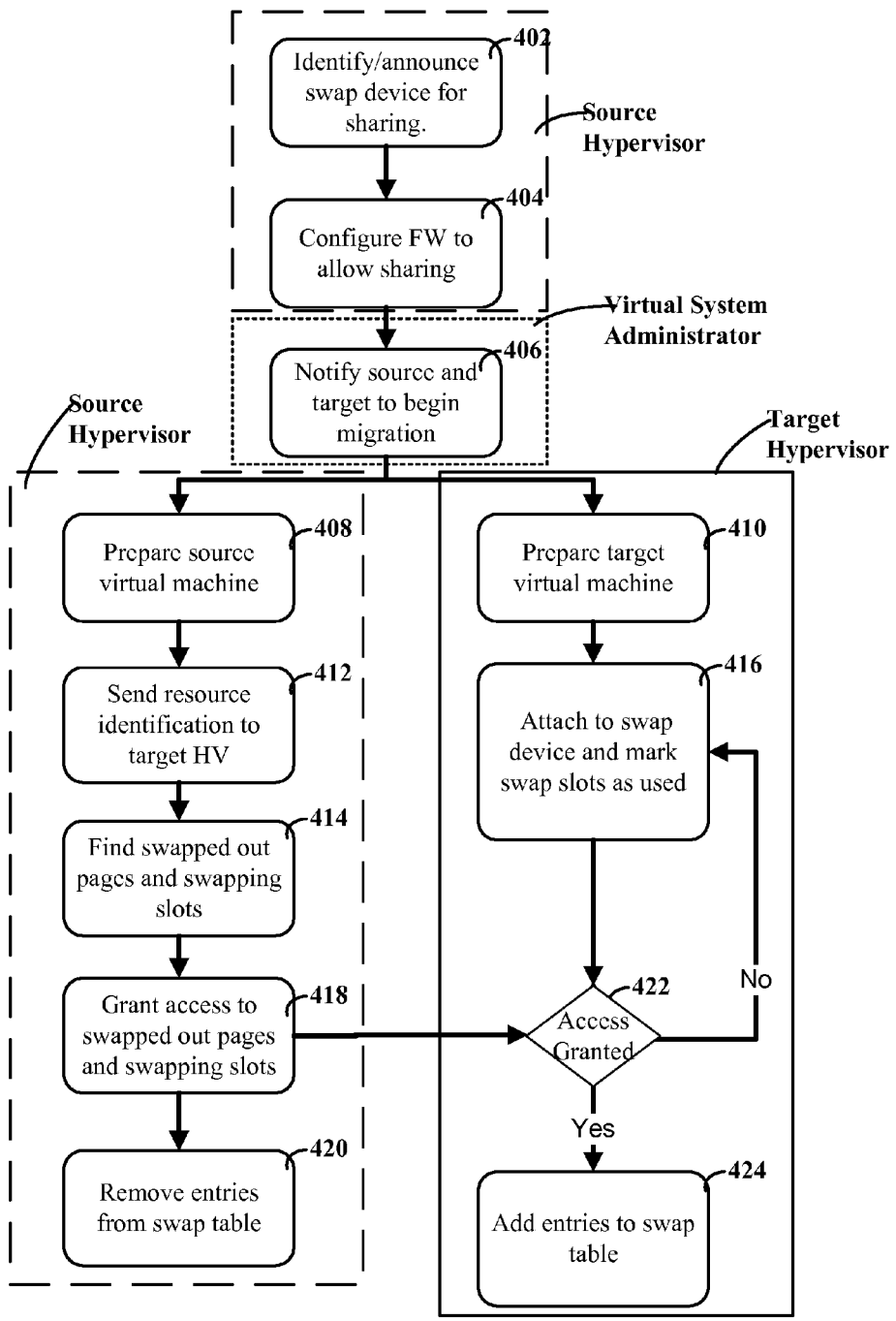
FIG. 4 depicts a flow diagram for the migration of a virtual machine to a new hypervisor in which the source hypervisor can prevent reuse of migrated swap slots, consistent with embodiments of the present disclosure.

FIG. 4 depicts a flow diagram for the migration of a virtual machine to a new hypervisor in which the source hypervisor can prevent the reuse of migrated swap slots, consistent with embodiments of the present disclosure. The various blocks are depicted within boxes having dashed, dotted or solid lines. In certain embodiments, functions associated with dashed lines can be carried out by a source hypervisor, those associated with dotted lines can be carried out by a common infrastructure or virtual system administrator module and those with solid lines can be carried out by a target hypervisor. The disclosure, however, is not necessarily so limited. For instance, functions associated with a particular hypervisor could be carried out by a separate module that is called by (or otherwise coordinated with) the hypervisor.

Beginning at block 402, a source hypervisor can identify a swap device and also announce to a common infrastructure (firmware) that the swap device is sharable. In certain embodiments, this announcement can be made in response to a received migration request. Embodiments are directed toward identifying multiple swap devices by traversing through a page table of the source hypervisor in order to identify all active swap devices. In response to the announcement, firmware can be configured to allow sharing of the swap device, per block 404.

A coordination module, such as a virtual system administrator module that is part of the firmware, can notify the source and target hypervisors that migration should begin, per block 406. The virtual system administrator module can be located in a variety of locations. In certain embodiments, the virtual system administrator module can be implemented in the firmware. In various embodiments it can be located on a separate server connected to the hypervisors via a network. In some instances, the virtual system administrator module controls the creation and deletion of hypervisors by accessing firmware. For example, the virtual system administrator module may perform a hypervisor update by creating an updated target hypervisor, moving virtual machines from a source hypervisor to the target hypervisor and then deleting the source hypervisor.

In response to the notification, the source hypervisor can prepare for the source instance of the virtual machine to be migrated, as shown in block 408. In certain embodiments, this can include pausing or halting the source instance and can also include identifying swap devices and swap slots for the source instance. Also in response, the target hypervisor can configure or prepare for a target instance of the virtual machine to be initiated, per block 410.

The source hypervisor can provide identified swap resources to the target hypervisor, per block 412. For instance, the source hypervisor can identify a particular swap device (e.g., a particular disk drive). In response, the target hypervisor can attach to the identified swap device and mark all swap slots as used, per block 416. By marking the swap slots as used, the target hypervisor will not attempt to allocate any of the slots for use by an operating system or virtual machine that is supported by the target hypervisor.

The source hypervisor can identify swapped out pages and their corresponding swap slots for the source instance of the virtual machine, per block 414. In certain embodiments, this can be accomplished by traversing its page table to find all swapped out pages and their corresponding swap slots. Based upon the results of this identification, the swap slots can be communicated to the target hypervisor and the common infrastructure (firmware) so that access can be granted to target hypervisor for the identified slots, per block 418.

The source hypervisor can then remove the source hypervisor's access rights to the identified swap slots, per block 420. For instance, the source hypervisor can remove all page tables for the source virtual machine. In certain embodiments, the source hypervisor can also leave the identified swap slots marked as used even though there is no page table of the source hypervisor that references these swap slots. This can be useful for preventing the source hypervisor from attempting to allocate the identified swap slots for future use by another virtual machine.

The target hypervisor can receive information about the identified swap pages and permit access thereto, per block 422. For instance, per block 424 the target hypervisor can extend its memory and modify a page table for the target instance of the virtual machine to include the identified swap slots. The target instance of the virtual machine being migrated can begin processing using these swap pages, which can be populated into virtual memory and accessed according to the modified page table.

Figure 5:
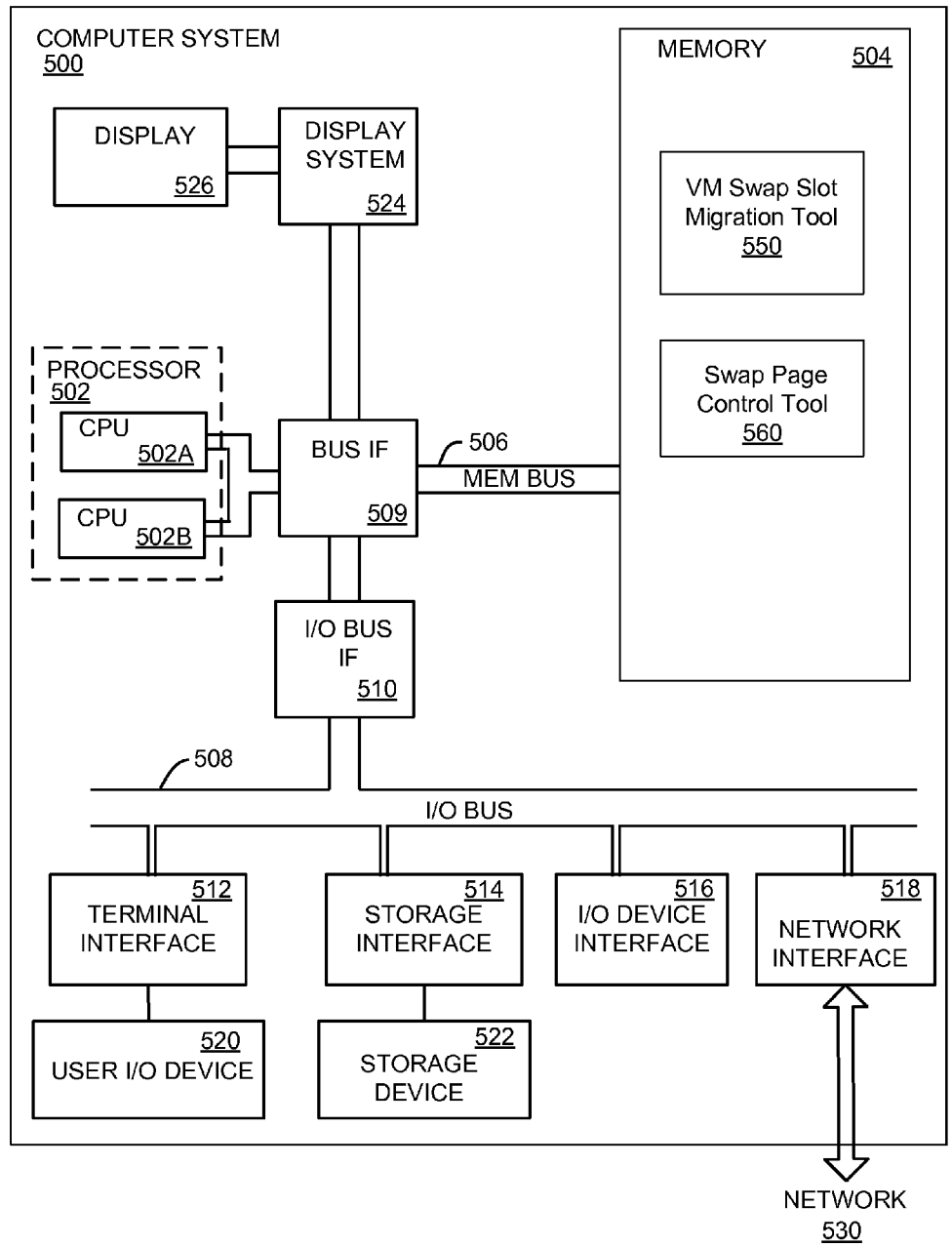
FIG. 5 depicts a high-level block diagram of a computer system for implementing various embodiments.

FIG. 5 depicts a high-level block diagram of a computer system 500 for implementing various embodiments. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a hypervisor 550 and/or a virtual machine 560. These programs and data structures are illustrated as being included within the memory 504 in the computer system 500, however, in other embodiments, some or all of them may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, while the hypervisor 550 and the virtual machine 560 are illustrated as being included within the memory 504, these components are not necessarily all completely contained in the same storage device at the same time.

In embodiments, the hypervisor 550 and the virtual machine 560 may include instructions or statements that execute on the processor 502 or instructions or statements that are interpreted by instructions or statements that execute on the processor 502 to carry out the functions as further described below. In certain embodiments, the hypervisor 550 and the virtual machine 560 are implemented in hardware via semiconductor devices, chips, logical gates, circuits, circuit cards, and/or other physical hardware devices in lieu of, or in addition to, a processor-based system. In embodiments, the hypervisor 550 and the virtual machine 560 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts several major components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for migrating a virtual machine between a source hypervisor and a target hypervisor that each support memory over commitment using one or more swap devices, the method comprising:
   receiving, by the source hypervisor, a migration request that specifies a source instance of the virtual machine on the source hypervisor and the target hypervisor;
   identifying, by the source hypervisor, at least one swap device that is used by the source instance of the virtual machine and that is physically accessible by the target hypervisor;
   identifying, by the source hypervisor and for each identified swap device, one or more source swap slots that store at least one swapped out page of the source instance of the virtual machine;
   halting, by the source hypervisor, processing by the source instance of the virtual machine;
   granting, to the target hypervisor, access to the one or more source swap slots identified by the source hypervisor;
   associating, by the target hypervisor, a target instance of the virtual machine with a swap table that references the one or more swap slots granted to the target hypervisor;
   using, by the target hypervisor, the one or more swap slots to populate swapped out virtual memory for the target instance of virtual machine; and
   carrying out a cleanup of swap slots by:
      copying, by a background process of the target hypervisor, a particular swapped slot from a shared swap device to another swap device owned by the target hypervisor;
      granting the particular swap slot to the source hypervisor;
      determining, by a particular hypervisor, that all swap slots stored on a particular shared swap device are assigned to the particular hypervisor; and
      requesting, by the particular hypervisor, that a resource manager remove the particular shared swap device from a sharing table that contains information identifying shared swap devices and assignment of swap slots in said shared swap devices to hypervisors.

2. The method of claim 1, further comprising maintaining, by the resource manager, the sharing table that contains information identifying shared swap devices and assignment of swap slots in said shared swap devices to hypervisors.

3. The method of claim 2, further comprising identifying a plurality of swap devices and wherein granting, to the target hypervisor, access to the one or more source swap slots further comprises:
   declaring the plurality of swap devices as shared devices;
   adding, by the resource manager, the plurality of swap devices to the sharing table; and
   assigning, in the sharing table, swap slots of the plurality of swap devices to the source hypervisor.

4. The method of claim 3 wherein granting, to the target hypervisor, access to the one or more source swap slots further comprises assigning, by the resource manager and in the sharing table, the one or more source swap slots to the target hypervisor.

5. The method of claim 4 wherein using one or more swap slots on a shared swap device by the target hypervisor comprises requesting information on swap slots assigned to the target hypervisor from the resource manager.

6. The method of claim 5, further comprising:
   determining, by a particular hypervisor, access rights to a particular swap slot on a particular shared swap device based on information requested from the sharing table of the resource manager; and
   limiting access to the particular shared swap slot in response to determined access rights.

7. The method of claim 3, wherein accesses to swap slots on shared swap devices are routed through the resource manager and accesses to the swap slots are enabled by the resource manager based upon the sharing table.

8. The method of claim 1, further comprising:
   copying, by the target hypervisor, a data structure defining a swapped out page of the source instance of the virtual machine by a source swap device address and a source swap slot address; and
   swapping the swapped out page into memory, by the target hypervisor and using the source swap device address and the source swap slot address.

* * * * *